(12) United States Patent
Steinz et al.

(10) Patent No.: US 11,588,379 B2
(45) Date of Patent: Feb. 21, 2023

(54) ARRANGEMENT FOR COOLING AN ELECTRIC MACHINE IN A MOTOR VEHICLE, AND METHOD FOR OPERATING THE ARRANGEMENT

(71) Applicant: Dr. Ing. h.c. F. Porsche Aktiengesellschaft, Stuttgart (DE)

(72) Inventors: Janina Steinz, Niefern-Oeschelbronn (DE); Stefan Oechslen, Stuttgart (DE)

(73) Assignee: Dr. ing. h. c. F. Porsche AG, Stuttgart (DE)

( * ) Notice: Subject to any disclaimer, the term of this patent is extended or adjusted under 35 U.S.C. 154(b) by 240 days.

(21) Appl. No.: 16/918,035

(22) Filed: Jul. 1, 2020

(65) Prior Publication Data

US 2021/0006132 A1 Jan. 7, 2021

(30) Foreign Application Priority Data

Jul. 1, 2019 (DE) ...................... 10 2019 117 637.9

(51) Int. Cl.
*H02K 9/197* (2006.01)
*B60K 1/00* (2006.01)
(Continued)

(52) U.S. Cl.
CPC ............... *H02K 9/197* (2013.01); *B60K 1/00* (2013.01); *B60K 11/02* (2013.01);
(Continued)

(58) Field of Classification Search
CPC ............ F16H 57/0415; F16H 57/0476; F16H 57/0435; F16H 57/0417; B60K 1/00;
(Continued)

(56) References Cited

U.S. PATENT DOCUMENTS

| | | | | |
|---|---|---|---|---|
| 2,285,960 A | * | 6/1942 | Fechheimer | ........... H02K 9/197 290/2 |
| 5,189,325 A | * | 2/1993 | Jarczynski | ............... H02K 9/19 310/61 |

(Continued)

FOREIGN PATENT DOCUMENTS

| | | | | |
|---|---|---|---|---|
| DE | 102012203695 A1 | * | 9/2013 | ............ B60L 3/0061 |
| DE | 10 2015 214 309 | | 2/2017 | |

(Continued)

*Primary Examiner* — Alex W Mok
(74) *Attorney, Agent, or Firm* — Gerald E. Hespos; Michael J. Porco

(57) ABSTRACT

A temperature control arrangement (1) of a motor vehicle has an electric machine (2) with a rotor (3) and a stator (4), a stator cooling arrangement with a first cooling circuit (6) for cooling the stator (4) with a first cooling medium (8) flowing in the first cooling circuit (6) that is formed by a motor vehicle cooling circuit, a rotor cooling arrangement with a second cooling circuit (7) for cooling the rotor (3) with a second cooling medium (9) flowing in the second cooling circuit (7) that is formed by a transmission oil cooling circuit, a heat exchanger (10) that thermally couples the first cooling circuit (6) and the second cooling circuit (7). The stator cooling arrangement is configured such that the first cooling medium (8) makes direct contact with the stator windings.

20 Claims, 5 Drawing Sheets

(51) Int. Cl.
  *B60K 11/02* (2006.01)
  *F16H 57/04* (2010.01)
  *H02K 7/116* (2006.01)

(52) U.S. Cl.
  CPC ..... *F16H 57/0415* (2013.01); *F16H 57/0476* (2013.01); *H02K 7/116* (2013.01); *B60K 2001/006* (2013.01)

(58) Field of Classification Search
  CPC .. B60K 11/02; B60K 2001/006; H02K 9/197; H02K 7/116
  USPC .......................................................... 310/54
  See application file for complete search history.

(56) References Cited

U.S. PATENT DOCUMENTS

| | | | |
|---|---|---|---|
| 5,347,188 A * | 9/1994 | Iseman | H02K 9/227 310/68 D |
| 6,762,520 B1 * | 7/2004 | Ehrhart | H02K 1/20 310/86 |
| 9,148,041 B2 * | 9/2015 | Knoblauch | H02K 9/19 |
| 9,287,754 B2 * | 3/2016 | Büttner | B60L 50/51 |
| 9,401,630 B2 * | 7/2016 | Garrard | H02P 29/032 |
| 9,431,878 B2 * | 8/2016 | Brandl | H02K 5/203 |
| 2004/0045749 A1 | 3/2004 | Jaura et al. | |
| 2005/0120720 A1 * | 6/2005 | Fang | H02K 5/12 62/3.1 |
| 2010/0012409 A1 | 1/2010 | Heidenreich et al. | |
| 2010/0264759 A1 | 10/2010 | Shafer et al. | |
| 2011/0008184 A1 * | 1/2011 | De Boer | F04D 25/0686 417/423.8 |
| 2013/0234543 A1 * | 9/2013 | Buttner | B60L 3/0061 310/54 |
| 2013/0269478 A1 | 10/2013 | Kalmbach et al. | |
| 2013/0270939 A1 * | 10/2013 | Brandl | H02K 9/19 310/54 |
| 2015/0247564 A1 * | 9/2015 | De Lathauwer | F16H 61/4165 460/59 |
| 2016/0178548 A1 * | 6/2016 | Berry | F28D 15/00 374/138 |
| 2017/0040872 A1 * | 2/2017 | Nitsch | H02K 9/19 |
| 2017/0175612 A1 | 6/2017 | Tokozakura et al. | |
| 2018/0138763 A1 * | 5/2018 | Nakamura | H02K 7/14 |
| 2019/0097482 A1 * | 3/2019 | Huber | H02K 5/203 |
| 2019/0120369 A1 | 4/2019 | Staake et al. | |
| 2019/0305643 A1 | 10/2019 | Huber et al. | |

FOREIGN PATENT DOCUMENTS

| | | | | |
|---|---|---|---|---|
| KR | 101267898 B1 * | 5/2013 | | |
| WO | WO-2015124450 A1 * | 8/2015 | ............. | H02K 9/00 |
| WO | 2017/220296 | 12/2017 | | |
| WO | 2018/137955 | 8/2018 | | |

* cited by examiner

ARRANGEMENT FOR COOLING AN ELECTRIC MACHINE IN A MOTOR VEHICLE, AND METHOD FOR OPERATING THE ARRANGEMENT

CROSS REFERENCE TO RELATED APPLICATION

This application claims priority under 35 USC 119 to German Patent Appl. No. 10 2019 117 637.9 filed on Jul. 1, 2019, the entire disclosure of which is incorporated herein by reference.

BACKGROUND

Field of the Invention

The invention relates to an arrangement for cooling an electric machine of a motor vehicle.

Related Art

Power losses generated in components of electric machines are released in the form of heat, and the heat can affect the stator and the rotor of the electric machine. Known motor vehicles that are powered by an electric machine output the drive power of the electric machine via a transmission. Some of these known motor vehicles use relatively high viscosity transmission oil to dissipate the heat generated in the rotor and use a relatively low viscosity motor vehicle cooling medium to dissipate heat released by the stator. This motor vehicle cooling medium is cooled by a cooler of the cooling circuit of the motor vehicle.

DE 10 2015 214 309 and WO 2017/220296 describe electric machines for motor vehicles where the stator of the electric machine is cooled by a vehicle cooling circuit, and the rotor of the electric machine is cooled by a transmission oil cooling circuit. A heat exchanger couples the transmission oil cooling circuit to the motor vehicle cooling circuit. Additionally, the stator is cooled on its radial outer side by a cooling jacket that surrounds the stator. WO 2017/220296 further discloses a bypass line in the transmission oil circuit. The bypass line is opened and closed in accordance with demand so that the fluid flow can be conducted past the heat exchanger in accordance with demand.

US 2004/0045749 describes an electric machine that is cooled by a transmission oil circuit.

US 2010/0012409 discloses an electric machine for use in a motor vehicle. A cooling oil flows in succession through a rotor and a stator of the electric machine so that the cooling oil flows directly around stator windings of the electric machine.

US 2010/0264759 and WO 2018/137955 each disclose an electric machine for use in a motor vehicle, wherein a rotor and a stator of the electric machine are cooled by the same transmission oil circuit configured so that the transmission oil flows through stator windings of the electric machine. WO 2018/137955 also discloses a heat exchanger arranged in a transmission oil circuit.

US 2013/0269478 describes an electric machine of a vehicle where a rotor and a stator of the electric machine are cooled by the same transmission oil circuit.

US 2017/0175612 describes a cooling system of a motor vehicle with two separate cooling circuits that are coupled to one another by a heat exchanger.

It is an object of the invention to provide a structurally compact electric machine that ensures optimum cooling of the stator of the electric machine. A further object is to provide an efficient cooling method for an electric machine.

SUMMARY

The invention relates to an electric machine where a stator cooling arrangement is configured such that a first cooling medium makes direct contact with the stator windings. This direct contacting is highly advantageous under the aspect that the stator windings generally constitute the power-limiting component. Power losses generated in the region of the stator optimally are dissipated by the direct contact of the first cooling medium with the stator windings.

The first cooling medium may flow around and/or through the stator windings.

The electric machine may be cooled differently in the different regions, specifically the rotor and the stator. More particularly, the stator may be cooled by the first cooling circuit, while the rotor is cooled by a second cooling circuit. The first cooling circuit may operate with a different medium than the second cooling circuit. The first cooling circuit may be formed by a motor vehicle cooling circuit, whereas the second cooling circuit may be formed by a transmission oil cooling circuit. The respective cooling media have a different viscosity. The cooling medium of the motor vehicle cooling circuit has a lower viscosity than the cooling medium of the transmission oil cooling circuit. The heat capacity of the transmission oil is thus relatively low.

Cooling of the stator may be carried out using a low-viscosity, electrically non-conductive medium, for example cooling oil, refrigerant etc. The stator is integrated directly into the cooling circuit of the vehicle. The use of transmission oil to cool the rotor can save structural space and can reduce pressures on a radial shaft sealing ring of a rotor shaft of the rotor. A heat-transferring means, such as a heat exchanger may link the transmission oil to the cooling circuit of the motor vehicle.

The second cooling circuit may have a connecting line that fluidically connects a portion of the second coolant circuit assigned to the rotor to a portion of the second cooling circuit assigned to a transmission. The heat exchanger may thermally couple the second cooling circuit to the first cooling circuit in the region of the connecting line to achieve a structurally compact arrangement with optimum heat transfer characteristics between the two cooling circuits.

The stator may have a stator laminated core with grooves and with winding arrangements in the grooves. The first cooling medium makes contact with the winding arrangements to achieve particularly good heat transfer in the region of the stator.

A seal may be arranged between the stator and the rotor. The seal may be a sealing sleeve connected to the inner circumference of the stator. The seal may be a non-magnetizable and/or electrically non-conductive material.

The first cooling medium may be a dielectric.

The portion of the second cooling circuit that is assigned to the rotor may be formed in a rotor shaft of the rotor. The rotor shaft of one embodiment has a cavity and the second medium flows through the cavity to achieve particularly efficient cooling of the rotor.

The first cooling circuit may have a bypass line that bridges the heat exchanger. If the bypass is opened, the second cooling medium (i.e. the transmission oil) no longer flows through the heat exchanger. The second cooling circuit also may have a bypass valve for controlling a flow rate of the second cooling medium flowing through the bypass line so that a proportion of the second cooling medium flows through the heat exchanger.

In one embodiment, the first cooling medium flows through at least one first portion of the first cooling circuit in a first direction or in a second direction that is opposite to the first direction, and the first cooling circuit comprises a device for switching the flow direction. In this way, the sequence of the throughflow in the motor vehicle cooling circuit can be changed. The first cooling medium thus flows first through the stator and then through the heat exchanger or, after a switchover, first through the heat exchanger and then through the stator.

The device for switching over the flow direction may a valve, such as a 4/2 valve. In a first switching position of the valve, the first cooling medium flows through the portion of the first cooling circuit in the first direction and, in a second switching position of the valve, the first cooling medium flows through the portion of the first cooling circuit in a second direction that is opposite to the first direction. This design permits a particularly straightforward change of the throughflow sequence of stator and heat exchanger. In particular, this arrangement has the electric machine with the two cooling circuits, the heat exchanger and also the transmission. An output shaft of the electric machine, in the present case a rotor shaft of the rotor, may be the input shaft of the transmission.

The invention also relates to a method that includes causing the first cooling medium to flow around the first cooling circuit such that the first cooling medium is warmed during the cooling of the stator, and the directing the warmed first cooling medium through the heat exchanger to thermally couple the first cooling medium to the second cooling circuit such that the second cooling medium is warmed. Alternatively, the method may cause the first cooling medium to flow through the cooling circuit such that the first cooling medium flows through the heat exchanger to thermally couple the first cooling medium to the second cooling circuit such that the first cooling medium is warmed.

Further features of the invention will emerge from the appended drawings and from the description of the embodiments depicted in the drawing, without the invention being restricted thereto.

DETAILED DESCRIPTION

Figure 1:
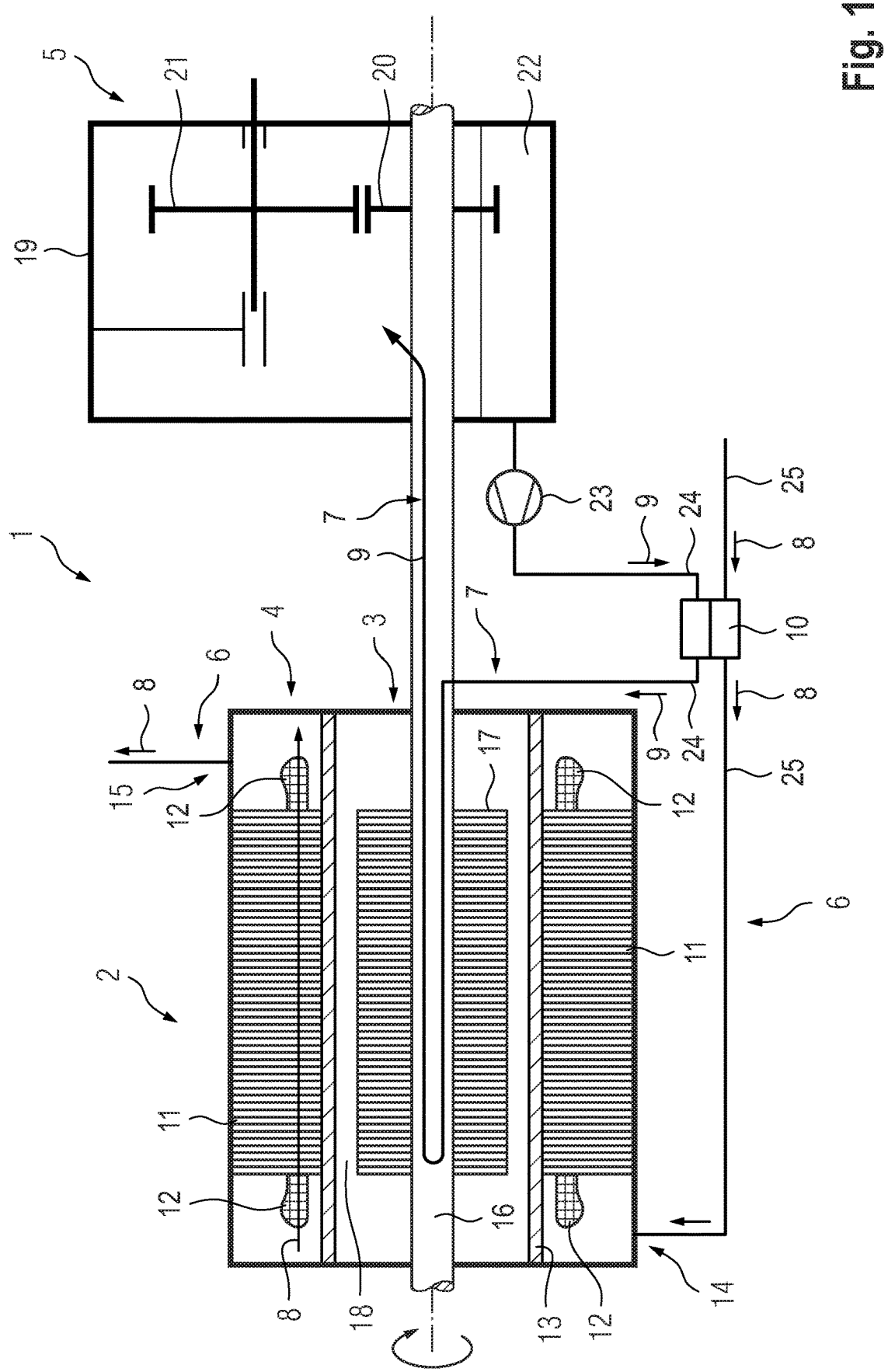
FIG. 1 shows a first exemplary embodiment of an arrangement of an electric machine and of a transmission and of the cooling arrangement thereof.

FIG. 1 shows an arrangement 1 for use in a motor vehicle. The arrangement 1 has an electric machine 2 with a rotor 3 and a stator 4. The arrangement 1 furthermore has a transmission 5. Furthermore, the arrangement 1 has a first cooling circuit 6 for cooling the stator 4 by means of a first cooling medium flowing in the first cooling circuit 6. Said cooling medium is a low-viscosity, dielectric, that is to say electrically non-conductive, medium, for example cooling oil, refrigerant. The first cooling circuit 6 is formed by a motor vehicle cooling circuit, that is to say that cooling circuit of the motor vehicle which serves for the cooling of a wide variety of assemblies of the motor vehicle and which is assigned a separate cooler, which cooler is exposed to the relative wind acting on the moving motor vehicle or else basically to a fan.

The arrangement 1 furthermore has a second cooling circuit 7 for cooling the rotor 3 by means of a second cooling medium flowing in the second cooling circuit 7. The second cooling circuit 7 is formed by a transmission oil cooling circuit. The second cooling medium 9 is thus transmission oil, which has a higher viscosity than the first cooling medium 8.

Furthermore, the arrangement 1 has a heat exchanger 10. The first cooling circuit 6 and the second cooling circuit 7 are thermally coupled by means of said heat exchanger.

The stator 4 has a stator laminated core 11 and a winding head 12. A radially inner part of the stator has a sealing sleeve 13 that seals off the stator with respect to the rotor 3. One end of the stator 4 has a connection 14 for the first cooling medium 8 and an opposite end has a further connection 15 for the first cooling medium 8.

The rotor 3 has a rotor shaft 16 and a rotor laminated core 17. An air gap 18 is between the rotor laminated core 17 and the sealing sleeve 13 of the stator 4.

The rotor shaft 16 is at least partially hollow so that, for the purposes of cooling the rotor 3, the second cooling medium 9 can flow into and through the rotor shaft 6, and the second cooling medium 9, after being diverted into the opposite direction, can flow through and out of the rotor shaft 16. The rotor shaft 16 also forms an input shaft of the transmission 5. The second cooling medium exits the rotor shaft 16 within a housing 19 of the transmission 5. The transmission 5 is a spur-gear transmission, and two toothed gears 20, 21 of one transmission stage are illustrated.

Proceeding from a transmission sump 22, the second cooling medium 9 is pumped by means of a transmission pump 23 through a connecting line 24 that is assigned to the heat exchanger 10. From the heat exchanger 10, the transmission oil passes through a partial region of the connecting line 24 into the rotor shaft 16, for the purposes of the cooling of the latter by means of the transmission oil.

A line 25 of the first cooling circuit 6 that is assigned to the heat exchanger 10 is connected to the connection 14. Proceeding from a first portion of the line 25, the first cooling medium 8 passes to the heat exchanger 10 and from there to the connection 14. The first cooling medium 8 then passes via the connection 14 into the cavity formed in the stator 4. The stator has a stator core with grooves and winding arrangements are in the grooves. The first cooling medium 8 makes contact with the winding arrangements. The first cooling medium 8 is conducted out of the stator 4, is discharged from the electric machine 2 via the connection 15, passes to the cooler of the first cooling circuit 6, and is fed from there to the heat exchanger 10 again via the line 24. By contrast, transmission oil returned via the rotor shaft 16 to the transmission 5 passes into the transmission sump 2 and, by means of the transmission pump 23, is fed again to the connecting line 24 and thus to the heat exchanger 10.

Figure 2:
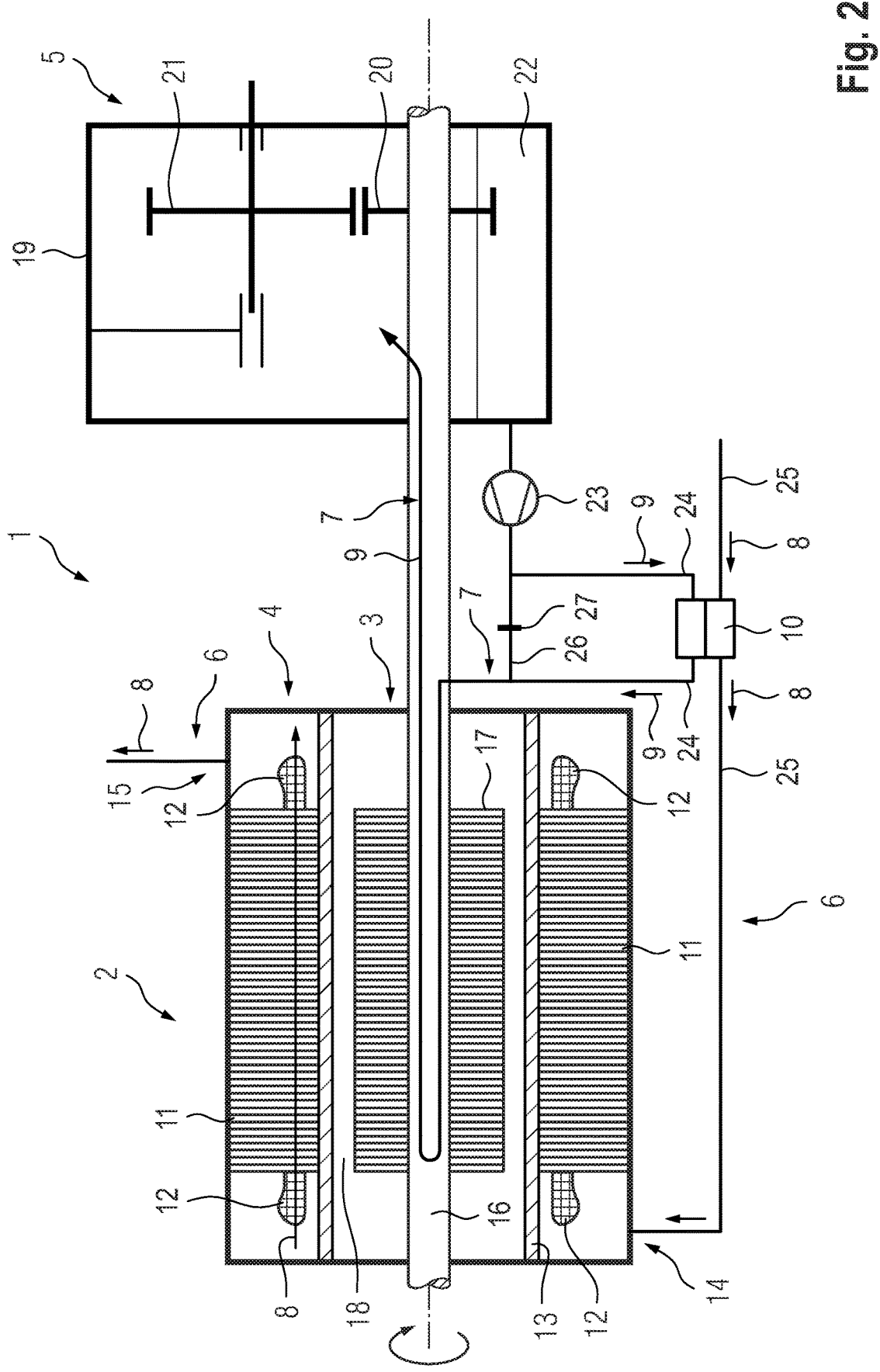
FIG. 2 shows a second exemplary embodiment of an arrangement of an electric machine and of a transmission and of the cooling arrangement thereof.

The second embodiment of FIG. 2 differs from the first embodiment of FIG. 1 only in that the connecting line 24 is connected, in the region upstream and downstream of the heat exchanger 10, to a bypass line 26. The bypass line 26 bridges the heat exchanger 10, but can be closed off by a closure 27. If the bypass line 26 is opened, the transmission oil no longer flows through the heat exchanger 10 owing to the relatively high pressure loss in relation to the bypass.

The embodiment of FIG. 1 constitutes the simplest variant, in which, in the vehicle, flow passes first through the heat exchanger 10 and then through the stator 4. The second embodiment of FIG. 2 constitutes a variant in which, when the bypass is open, little warming of the first coolant 8 passing through the heat exchanger 10 occurs, and thus particularly good cooling of the stator 4 is ensured. The closure 27 of the bypass line 26 may be a bypass valve for controlling the flow rate of the second cooling medium/ transmission oil flowing through the bypass line 26.

Figure 3:
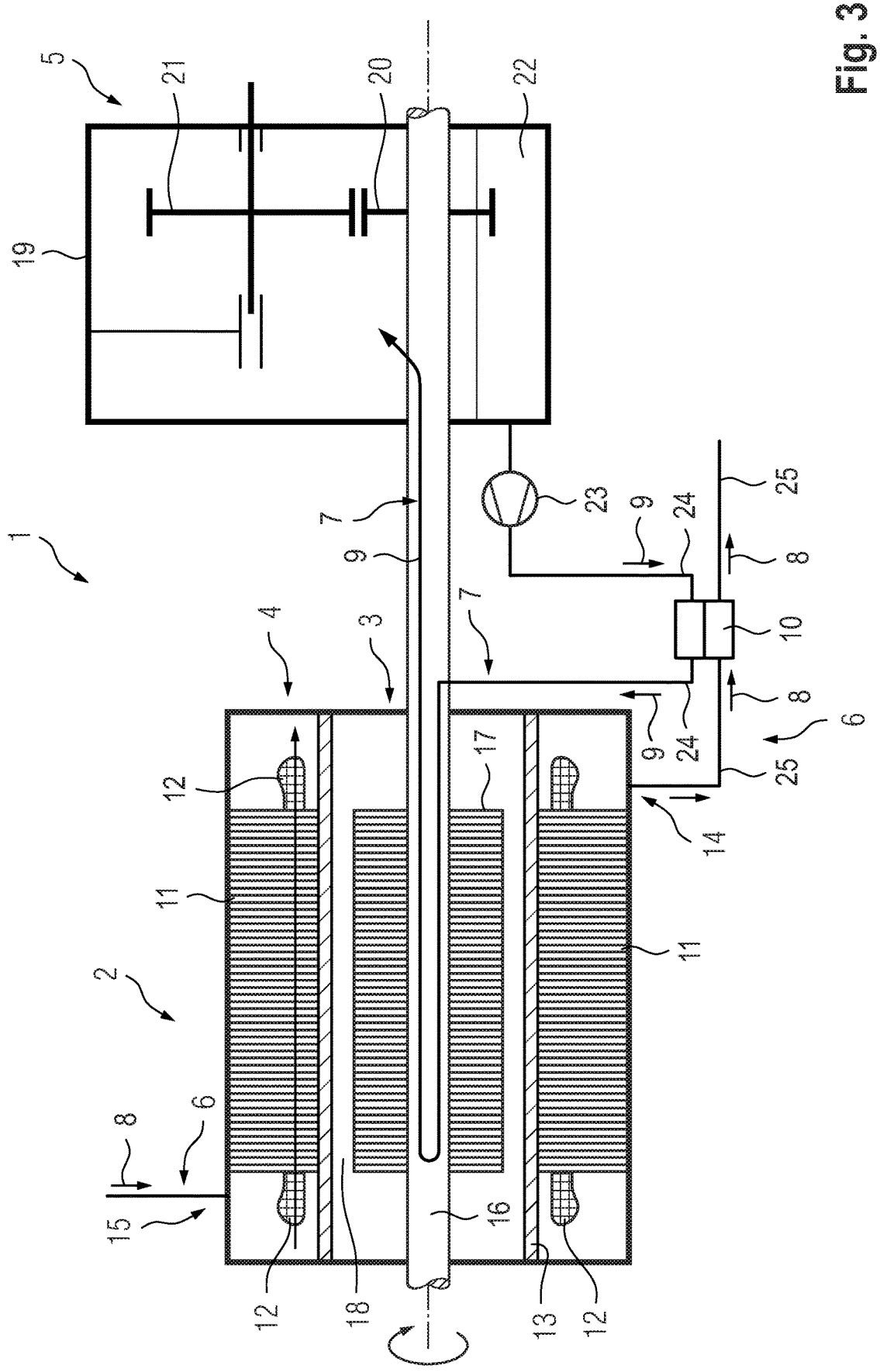
FIG. 3 shows a third exemplary embodiment of an arrangement of an electric machine and of a transmission and of the cooling arrangement thereof.

The third embodiment is illustrated in FIG. 3 and differs from the first exemplary embodiment of FIG. 1 merely in that the sequence of the throughflow in the first cooling circuit 6 has been changed. The first cooling medium 8 flows first through the stator 4 and then through the heat exchanger 10. This variant is used if fast heating of the transmission oil is desired.

Figure 4:
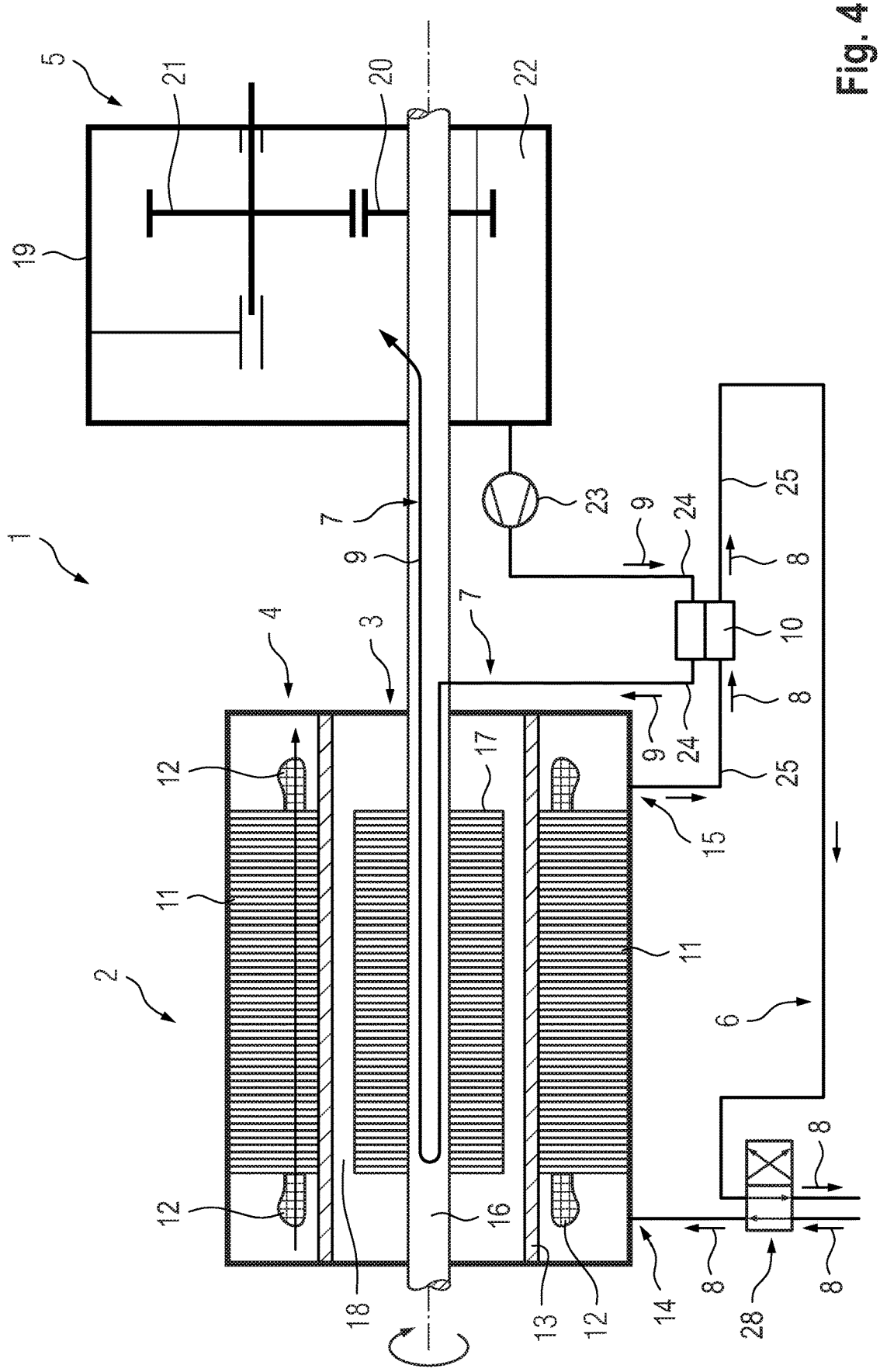
FIG. 4 shows a fourth exemplary embodiment of an arrangement of an electric machine and of a transmission and of the cooling arrangement thereof, for a first switching state.

The fourth embodiment is illustrated in FIG. 4, and shows the first cooling circuit 6 and a switchable valve 28 in the form of a 4/2 directional valve. In the first switching position of the valve 28 shown in FIG. 1, relatively cold first cooling medium 8 flows via the connection 14 into the stator 4 and passes from the stator 4 via the connection 15 and from there via the heat exchanger 10 back to the valve 28. The connections 14 and 15 are arranged on the same side of the stator.

Figure 5:
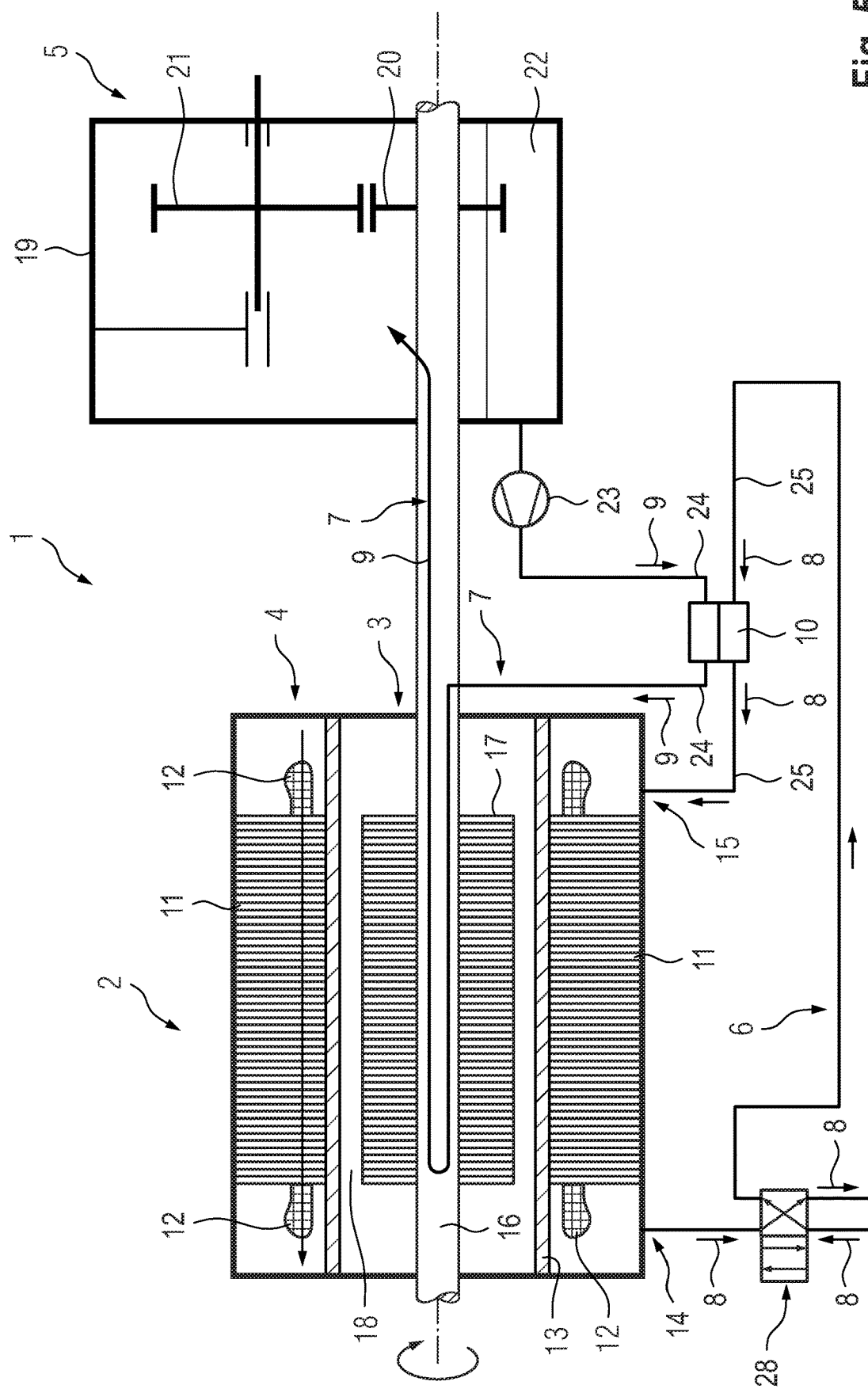
FIG. 5 shows the fourth exemplary embodiment for a second switching state.

By contrast, in the second position of the valve 28 illustrated in FIG. 5, relatively cold first cooling medium 8 passes from the valve 28 via the heat exchanger 10 to the connection 15 and from there into the stator 4, and from the stator 4 via the connection 14 back to the valve 28.

The valve 28 can be operated to change the throughflow sequence of the stator 4 and the heat exchanger 10 in accordance with demand. The switching position shown in FIG. 4 warms the transmission oil with the warm medium emerging from the stator 4. Thus, efficiency of the transmission 5 can be increased to launch when cold. The switching position of the valve 28 shown in FIG. 5, causes a flow first through the heat exchanger 10 and then through the stator 4. Here, the rotor 3 receives the cold transmission oil and is cooled ideally. The transmission oil warms in the rotor shaft 16 and then is returned into the transmission 5. Accordingly, in a cold vehicle, the first coolant 8 is fed first to the stator 4 and then to the heat exchanger, whereas, in a warm vehicle, for purposes of cooling, the first cooling medium 8 is fed first to the heat exchanger 10 and then to the stator 4. This embodiment has the best functionality.

What is claimed is:

1. An arrangement for use in a motor vehicle, having:
   an electric machine with a rotor and a stator, the stator having stator windings,
   a stator cooling arrangement with a first cooling circuit for cooling the stator by a first cooling medium flowing in the first cooling circuit, wherein the first cooling circuit is formed by a motor vehicle cooling circuit,
   a rotor cooling arrangement with a second cooling circuit for cooling the rotor by a second cooling medium flowing in the second cooling circuit, the second cooling circuit being fluidically separate and independent from the first cooling circuit and the second cooling medium being different from the first cooling medium, wherein the second cooling circuit is formed by a transmission oil cooling circuit, and
   a heat exchanger that thermally couples the first cooling circuit and the second cooling circuit, wherein
   the stator cooling arrangement is configured such that the first cooling medium makes direct contact with the stator windings.

2. The arrangement of claim 1, wherein the first cooling medium flows through and/or around the stator windings.

3. The arrangement of claim 1, wherein the second cooling circuit has a connecting line that fluidically connects a portion of the second cooling circuit assigned to the rotor to a portion of the second cooling circuit assigned to a transmission, the heat exchanger thermally couples the second cooling circuit to the first cooling circuit in a region of the connecting line.

4. The arrangement of claim 1, wherein the stator has a stator core with grooves and winding arrangements arranged in the grooves, the first cooling medium making contact with the winding arrangement.

5. The arrangement of claim 1, further comprising a seal arranged between the stator and the rotor.

6. The arrangement of claim 5, wherein the seal is a sealing sleeve.

7. The arrangement of claim 1, wherein the first cooling medium is a dielectric.

8. The arrangement of claim 1, wherein that portion of the second cooling circuit assigned to the rotor is formed in a rotor shaft of the rotor.

9. The arrangement of claim 8, wherein the rotor shaft has a cavity, and the second cooling medium flows through the cavity.

10. The arrangement of claim 1, wherein the first cooling circuit has a bypass line that bridges the heat exchanger.

11. The arrangement of claim 10, wherein the second cooling circuit has a closure.

12. The arrangement of claim 11, wherein the closure is a bypass valve for controlling a flow rate of the second cooling medium flowing through the bypass line.

13. The arrangement of claim 1, wherein the first cooling medium flows through at least one portion of the first cooling circuit in a first direction or in a second direction opposite to the first direction, and the first cooling circuit comprises a device for switching over the flow direction.

14. The arrangement of claim 13, wherein the device is a valve, wherein, in a first switching position of the valve, the first cooling medium flows through the portion of the first cooling circuit in the first direction and, in a second switching position of the valve, the first cooling medium flows through the portion of the first cooling circuit in a second direction that is opposite to the first direction.

15. The arrangement of claim 14, wherein the valve is a 4/2 valve.

16. The arrangement of claim 1, further comprising a transmission.

17. A method for operating the arrangement of claim 1, wherein the first cooling medium flows through the first cooling circuit such that the first cooling medium is warmed during the cooling of the stator, and the heat exchanger thermally couples the warmed first cooling medium to the second cooling circuit such that the second cooling medium is warmed.

18. A method for operating the arrangement of claim 1, wherein the first cooling medium flows through the first cooling circuit such that the heat exchanger thermally couples the first cooling medium to the second cooling circuit such that the first cooling medium is warmed.

19. The arrangement of claim 1 wherein the first cooling medium has a lower viscosity than the second cooling medium.

20. A method for cooling an electric machine of a motor vehicle, the electric machine having a rotor and a stator, the stator having stator windings and the rotor having a rotor shaft, the motor vehicle having a transmission housing and a transmission in the transmission housing, the transmission being connected to the rotor shaft, the method comprising: directing a nonconductive first cooling medium of a motor vehicle cooling circuit into direct contact with the stator windings for cooling the stator windings; directing a second cooling medium from the transmission housing, through the rotor shaft and back to the transmission housing for cooling both the transmission and the rotor, the second cooling medium being a transmission oil and having a higher viscosity than the first cooling medium; and passing the first cooling medium in proximity to the second cooling medium for thermally coupling the first and second cooling medium without direct fluid connection.

\* \* \* \* \*